United States Patent
Groette et al.

(10) Patent No.: US 10,253,886 B2
(45) Date of Patent: Apr. 9, 2019

(54) HIGH TEMPERATURE SUBSEA DYNAMIC SEALS

(71) Applicant: FRAMO ENGINEERING AS, Bergen (NO)

(72) Inventors: Robert Groette, Bergen (NO); Anders Brunvold, Bergen (NO); Per Gunnar Vikre, Bergen (NO); Haakon Jostein Grimstad, Soereidgrend (NO)

(73) Assignee: Framo Engineering AS (NO)

( * ) Notice: Subject to any disclaimer, the term of this patent is extended or adjusted under 35 U.S.C. 154(b) by 567 days.

(21) Appl. No.: 14/767,377

(22) PCT Filed: Feb. 12, 2014

(86) PCT No.: PCT/US2014/016112
§ 371 (c)(1),
(2) Date: Aug. 12, 2015

(87) PCT Pub. No.: WO2014/127048
PCT Pub. Date: Aug. 21, 2014

(65) Prior Publication Data
US 2015/0377358 A1 Dec. 31, 2015

Related U.S. Application Data

(60) Provisional application No. 61/763,922, filed on Feb. 12, 2013.

(51) Int. Cl.
*F16J 15/34* (2006.01)
*F16J 15/40* (2006.01)
(Continued)

(52) U.S. Cl.
CPC ............ *F16J 15/34* (2013.01); *E21B 43/121* (2013.01); *F04D 3/005* (2013.01); *F04D 19/002* (2013.01);
(Continued)

(58) Field of Classification Search
CPC ......... F16J 15/34; E21B 43/121; F04D 3/005; F04D 19/002; F04D 29/181; F04D 29/32; F04D 29/102
See application file for complete search history.

(56) References Cited

U.S. PATENT DOCUMENTS

| | | | | |
|---|---|---|---|---|
| 2,824,759 A | * | 2/1958 | Tracy | F04D 29/128 277/361 |
| 3,169,024 A | * | 2/1965 | Johnson | F16J 15/008 277/321 |
| 3,540,742 A | * | 11/1970 | Tracy | F16J 15/342 277/388 |
| 3,540,833 A | * | 11/1970 | Talamonti | F04D 29/126 277/396 |
| 3,905,605 A | * | 9/1975 | Hubner | F16J 15/3404 277/360 |
| 4,082,297 A | * | 4/1978 | Adams | F04D 29/106 277/348 |
| 5,052,694 A | | 10/1991 | Lipschitz | |
| 5,417,544 A | * | 5/1995 | Mohn | F04D 1/003 415/213.1 |

(Continued)

OTHER PUBLICATIONS

International Search Report and Written Opinion dated Jun. 6, 2014 for International Application No. PCT/US2014/016112 filed Feb. 12, 2014.

*Primary Examiner* — Patrick Maines
(74) *Attorney, Agent, or Firm* — Conley Rose, P.C.

(57) ABSTRACT

Systems and methods are described for processing a high-temperature process fluid using a processing machine in a subsea location while protecting dynamic seals within the machine. In some examples a small portion of the process fluid is cooled using a cooling system the cooled process fluid is then directed towards the dynamic seals. In other examples the dynamic seals are shielded and isolated from the high temperature process fluid and cooler barrier fluid is circulated within an enclosed volume in proximity to the seal.

25 Claims, 10 Drawing Sheets

(51) Int. Cl.
| | |
|---|---|
| *E21B 43/12* | (2006.01) |
| *F04D 3/00* | (2006.01) |
| *F04D 19/00* | (2006.01) |
| *F04D 29/043* | (2006.01) |
| *F04D 29/053* | (2006.01) |
| *F04D 29/06* | (2006.01) |
| *F04D 29/063* | (2006.01) |
| *F04D 29/10* | (2006.01) |
| *F04D 29/18* | (2006.01) |
| *F04D 29/32* | (2006.01) |
| *F04D 29/58* | (2006.01) |

(52) U.S. Cl.
CPC ......... *F04D 29/043* (2013.01); *F04D 29/053* (2013.01); *F04D 29/061* (2013.01); *F04D 29/063* (2013.01); *F04D 29/102* (2013.01); *F04D 29/106* (2013.01); *F04D 29/181* (2013.01); *F04D 29/32* (2013.01); *F04D 29/5826* (2013.01); *F04D 29/5866* (2013.01); *F16J 15/3404* (2013.01); *F16J 15/40* (2013.01)

(56) References Cited

U.S. PATENT DOCUMENTS

| | | | | |
|---|---|---|---|---|
| 5,772,396 | A * | 6/1998 | Rockwood | F04D 29/128 277/408 |
| 6,468,028 | B1 * | 10/2002 | Rockwood | F04D 29/049 415/111 |
| 7,112,033 | B1 * | 9/2006 | Holdorf | F04D 29/128 277/360 |
| 2011/0198813 | A1 * | 8/2011 | Takahashi | F04D 29/122 277/387 |
| 2012/0107143 | A1 | 5/2012 | Gilarranz et al. | |
| 2012/0280456 | A1 * | 11/2012 | Young | F16J 15/3412 277/400 |
| 2013/0139888 | A1 * | 6/2013 | Gablonski | F16J 15/182 137/1 |

* cited by examiner

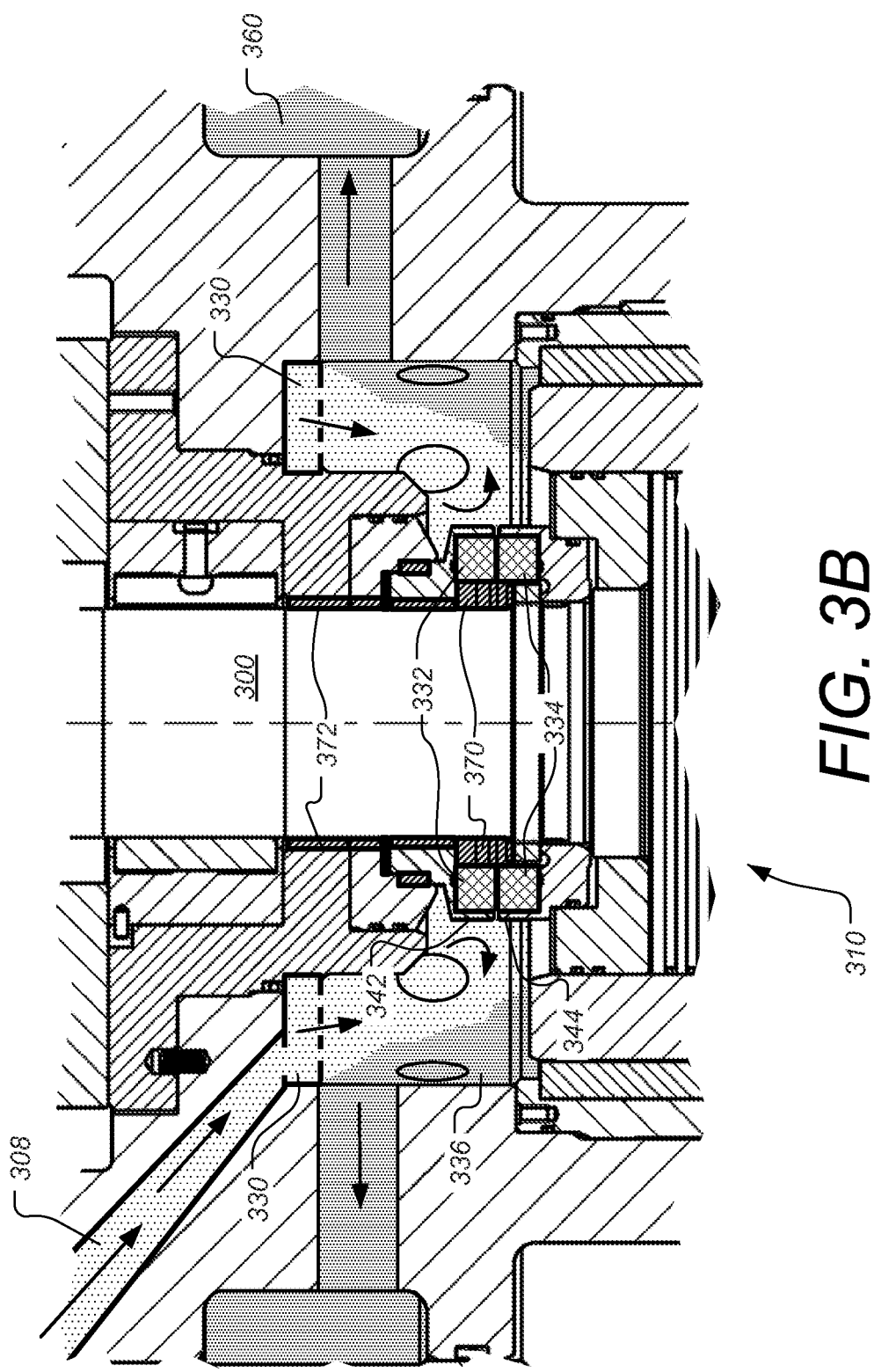

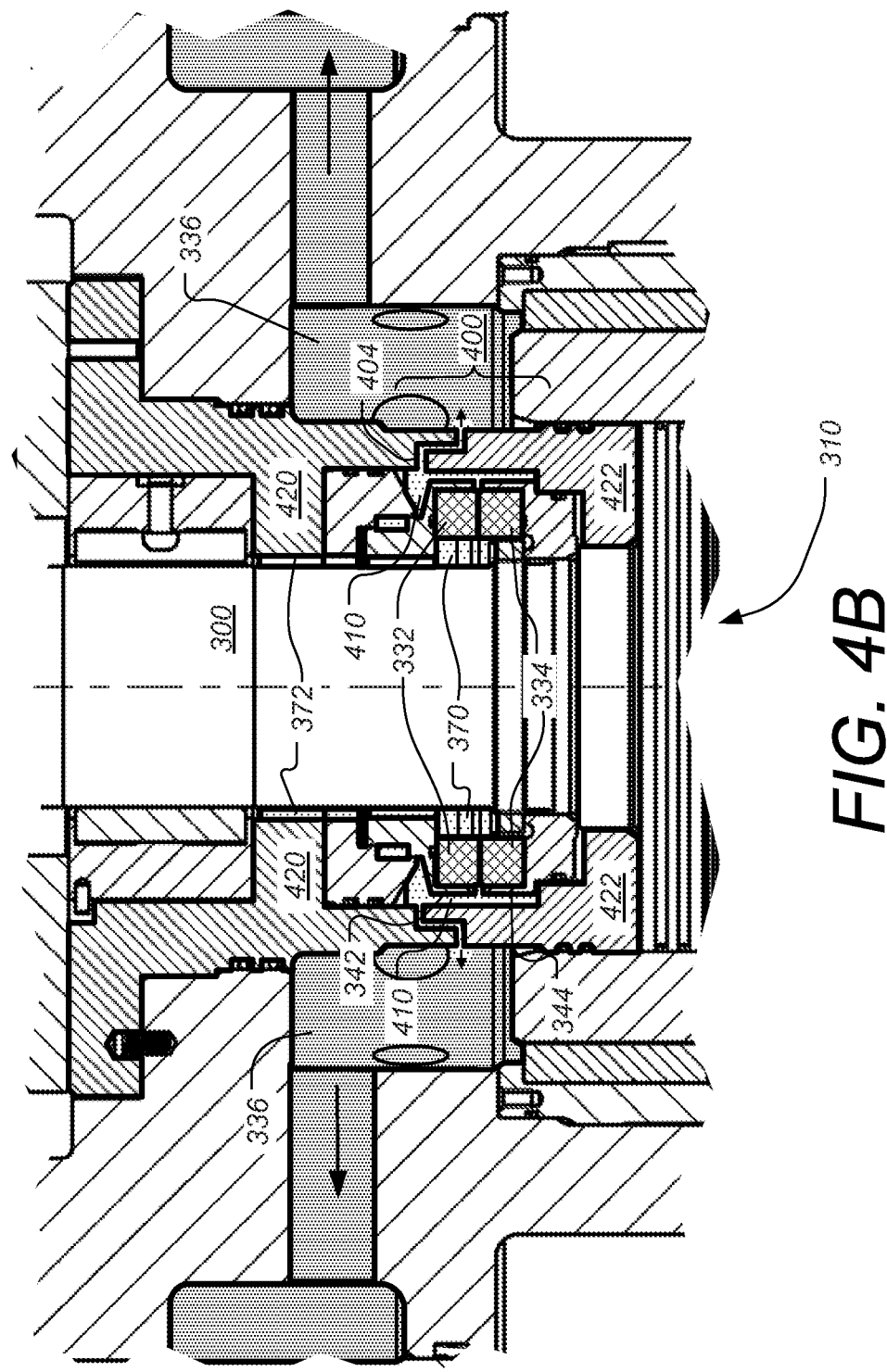

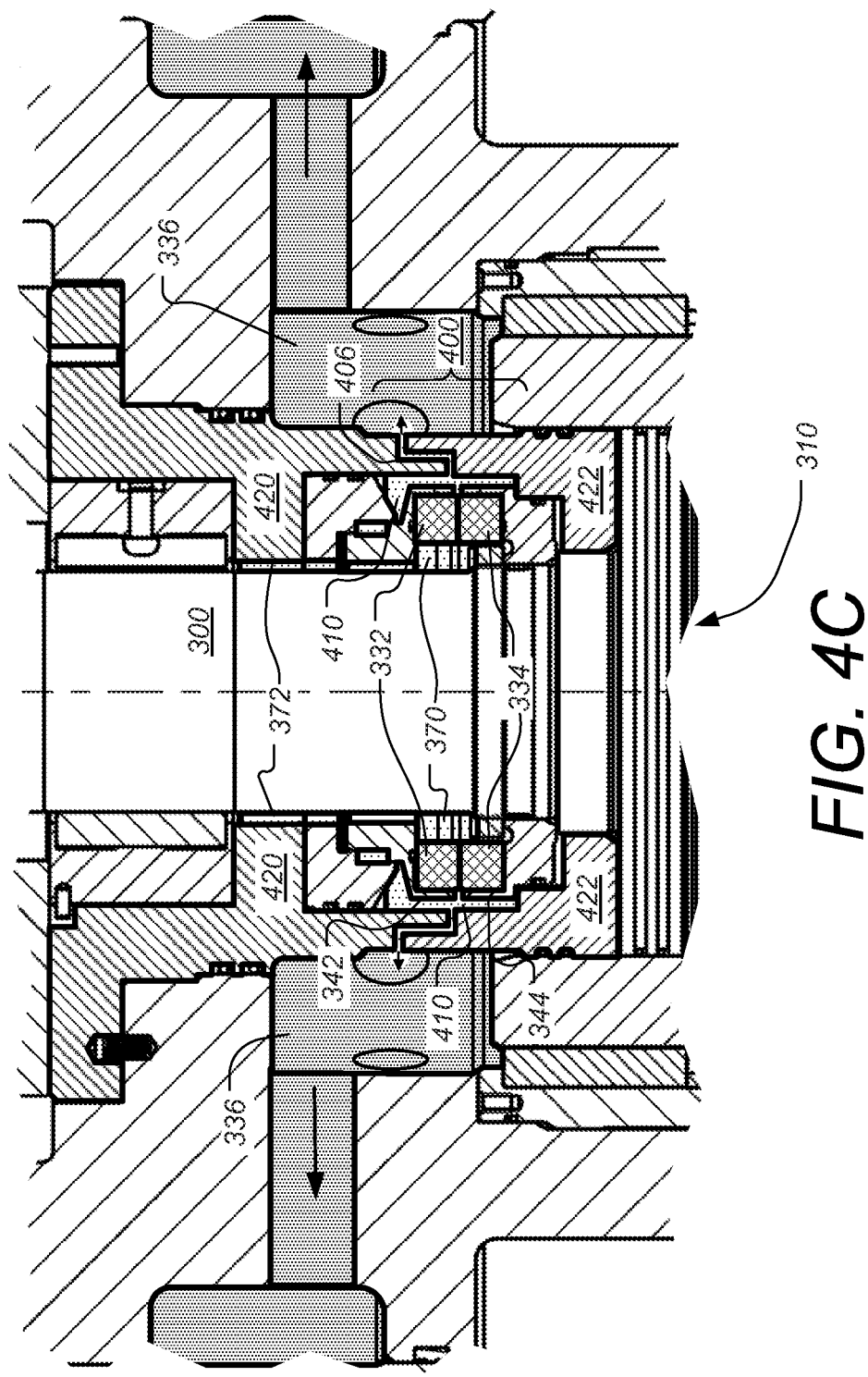

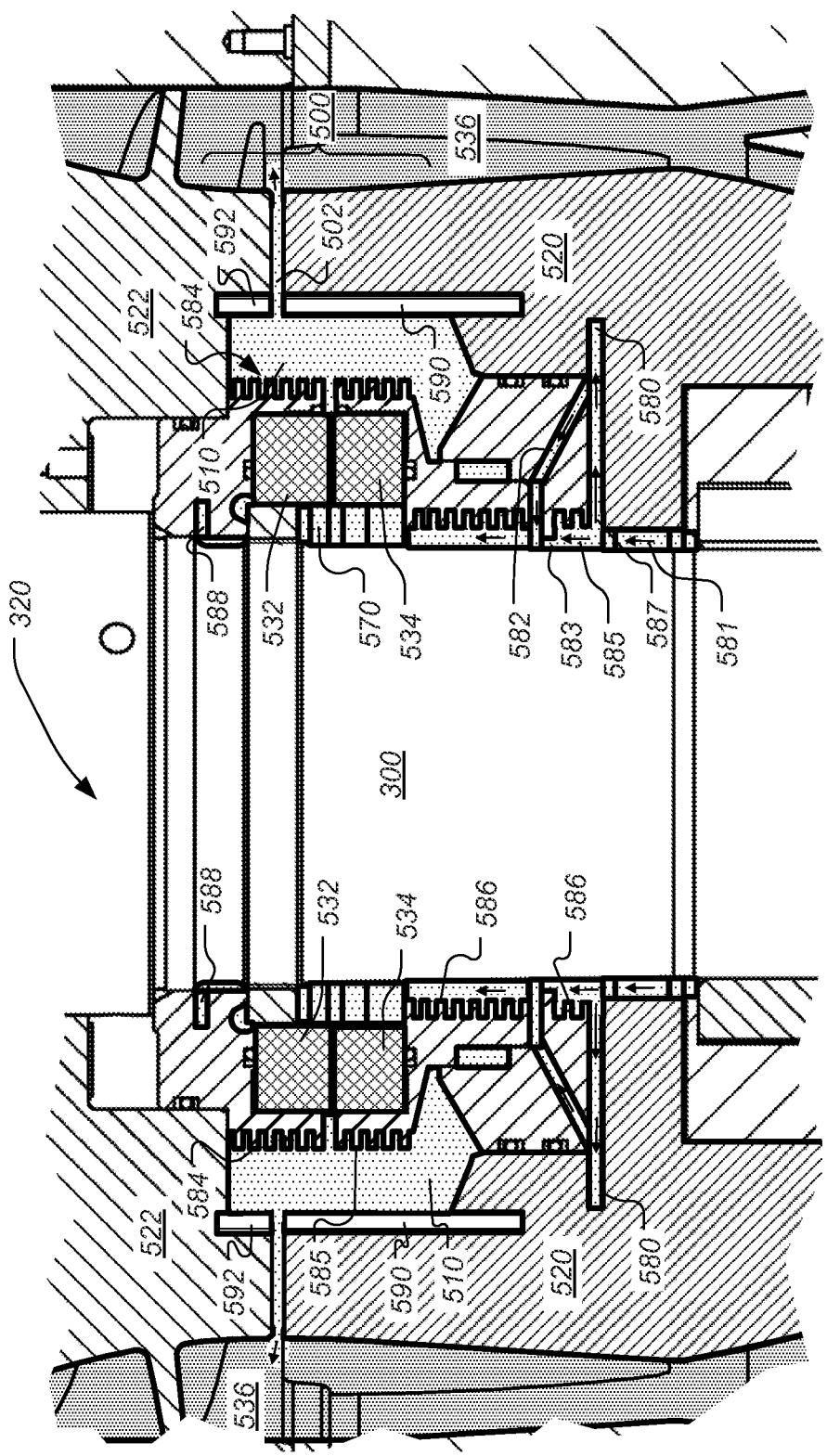

HIGH TEMPERATURE SUBSEA DYNAMIC SEALS

CROSS-REFERENCE TO RELATED APPLICATIONS

This patent application claims the benefit of U.S. Provisional Application Ser. No. 61/763,922 filed Feb. 12, 2013, which is incorporated herein by reference in its entirety.

BACKGROUND

Technical Field

The present disclosure relates generally to fluid dynamics and mechanical engineering for rotating machines like subsea pumps and subsea compressors. More particularly, the present disclosure relates to dynamic seal equipped subsea fluid processing systems configured to process high-temperature process fluids.

Background

Within subsea machines having rotating elements, such as pumps and compressors, dynamic seals play an important role. The dynamic seals are used to seal-off the lubrication fluid from the fluid being processed (e.g. the fluid being pumped or compressed). The lubrication system (also known as the barrier fluid system) is typically designed to be maintained at a higher pressure than the fluid being processed. A primary reason for this is that the barrier fluid is maintained as a clean fluid provide machine lubrication and cooling. Further, the barrier fluid will act as a barrier to materials, which may be present in the processed fluid. In the case of oil and gas produced from subterranean reservoirs, material in the processed fluid can include sand, H2S and scale, all of which is desirable to be kept away from the dynamic seals.

A dynamic seal is typically made from materials such as high alloy steel, titanium and/or silicon carbide. The silicon carbide is a material very resistant to wear due to high tensile strength and smooth surface resulting in low friction properties. The seal includes components made of different material that may be affected by pressure and temperature in different ways.

Within subsea technology, there are particular locations, such as the Gulf of Mexico, where fields exhibit relatively high pressures and/or high temperatures. In order to maintain the performance of the seals, there is a need to address consequences of exposure to such high temperatures and/or high pressures. For high process pressure fields, a known technique is to compensate with a higher barrier fluid pressure in order for the seal to experience the same pressure differential.

As for high process fluid temperatures, some limitations relate to material used to manufacture the seal. For example, the relationship between temperature and component shrinkage is an important parameter for engineering packing/containment designs. In designing high temperature seals, an important consideration is the residual strain that might occur within the component material (like silicon carbide) when at low temperature conditions. On the other hand, at high temperatures there is a tendency to have less component shrinkage due to thermal expansion in packing/containment material.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments a subsea fluid processing machine is described that is adapted to process a high-temperature subsea process fluid. The machine includes: a stationary machine body configured for deployment in a subsea location; at least one rotating member configured to rotate about a central axis thereby mechanically processing the high temperature process fluid at the subsea location; a dynamic seal configured to form a mechanical seal between the stationary body and the rotating member (or between two contra-rotating members), the dynamic seal including two seal portions that rotate with respect to each other; a shielding portion positioned and configured to shield the dynamic seal from the high temperature process fluid; and an enclosed volume defined by the shielding portion and one or more surfaces of the dynamic seal, the volume configured to contain a collected lubricating fluid that is maintained cooler than the high temperature process fluid. The nature of such a dynamic seal is to have some oil consumption from the clean side, which has a higher pressure than the process fluid side.

According to some embodiments, the rotating member includes a rotating central shaft and at least one impeller fixed thereto configured to increase the pressure of the process fluid as the impeller is rotated. The machine can be, for example, a subsea pump or a subsea compressor. The lubricating fluid can be a machine barrier fluid.

According to some embodiments, the shielding portion is made up of a stationary portion configured to remain stationary with the machine body, and a rotating portion configured to rotate with the rotating member. According to some other embodiments, the shielding portion is made of two rotating portions that contra-rotate with respect to each other. The two portions of the shielding portion define a gap therebetween through which the lubricating fluid is able to pass through. The gap can be straight or of another shape to further increase the protection of the seal. For example, the gap can be step-wise shaped. According to some embodiments, the machine includes structures configured to enhance heat exchange between the lubricating fluid and the dynamic seal, such as a plurality of fins or channels through which the lubricating fluid is configured to circulate.

According to some embodiments, the shielding portion and the enclosed volume are configured to isolate the dynamic seal from contamination from the process fluid, thereby reducing adverse effects to the dynamic seal due to exposure to the process fluid.

According to some embodiments, a method is described for processing a high temperature process fluid using a processing machine in a subsea location while protecting a dynamic seal within the machine. The method includes: rotating a member about a central axis within a stationary machine body thereby processing the high temperature process fluid; shielding the dynamic seal from the high temperature process fluid using a shielding portion; and circulating a lubricating fluid through an enclosed volume defined by the shielding portion and one or more surfaces of the dynamic seal, the lubricating fluid being cooler than the high temperature process fluid.

According to some embodiments, a subsea fluid processing machine is described that is adapted to process a high-temperature subsea process fluid. The machine includes: a stationary machine body configured for deployment in a subsea location; at least one rotating member configured to rotate about a central axis thereby mechanically processing the high temperature process fluid at the subsea location; a dynamic seal configured to form a mechanical seal between the stationary body and the rotating member (or between two contra-rotating members), the dynamic seal including two seal portions that rotate with respect to each other; and a process fluid cooling system configured to cool a portion of the process fluid and direct the cooled process fluid towards the external surfaces of the dynamic seal thereby reducing adverse effects to the dynamic seal due to exposure to un-cooled high-temperature process fluid.

According to some embodiments the process fluid cooling system configured to cool a small fraction of the process fluid by transferring heat to from the process fluid to ambient seawater. The cooled process fluid is then directed to the dynamic seals so alleviate adverse temperature effects. Examples of the cooling system include integrated circumferential coils surrounding the machine body, and a separate heat exchanger unit.

According to some embodiments, a method is described for processing a high temperature process fluid using a processing machine in a subsea location while protecting a dynamic seal within the machine. The method includes: rotating a member about a central axis within a stationary machine body thereby processing the high temperature process fluid; cooling a portion of the high temperature process fluid to a cooled process fluid; and directing the cooled process fluid towards external surfaces of the dynamic seal thereby reducing adverse effects to the dynamic seal due to exposure the high temperature process fluid.

According to some embodiments, environmental conditions surrounding a subsea dynamic seal are addressed in a novel fashion. According to some embodiments, temperature exposure of a subsea dynamic seal is controlled, for example, in a subsea pump or a subsea compressor. According to some embodiments, methods and systems are described that use the internal barrier fluids of subsea pumps and/or compressors for cooling purposes.

According to some embodiments, techniques are described to maintain subsea dynamic seal performance by protecting the seal from exposure to unfavorable high-temperature process fluid exposure conditions.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIG. 3B is a diagram illustrating further details of cooling subsea dynamic seals using cooled process fluid, according to some embodiments;

FIGS. 4B and 4C are diagrams illustrating further aspects of cooling dynamic seals using heat shielding and barrier fluid, according to some embodiments; and FIGS. 5A and 5B are diagrams illustrating aspects of cooling dynamic seals using heat shielding and barrier fluid, according to some embodiments.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

In terms of pressure and temperature, dynamic seals usually have an operational envelope they can endure. Options to increase the operational envelope include: changing the design to optimize the seal; addressing the environmental conditions around the seal (for example by cooling locally in the proximity to the seal face when exposed to high temperatures); or a combination of the two.

Figure 1:
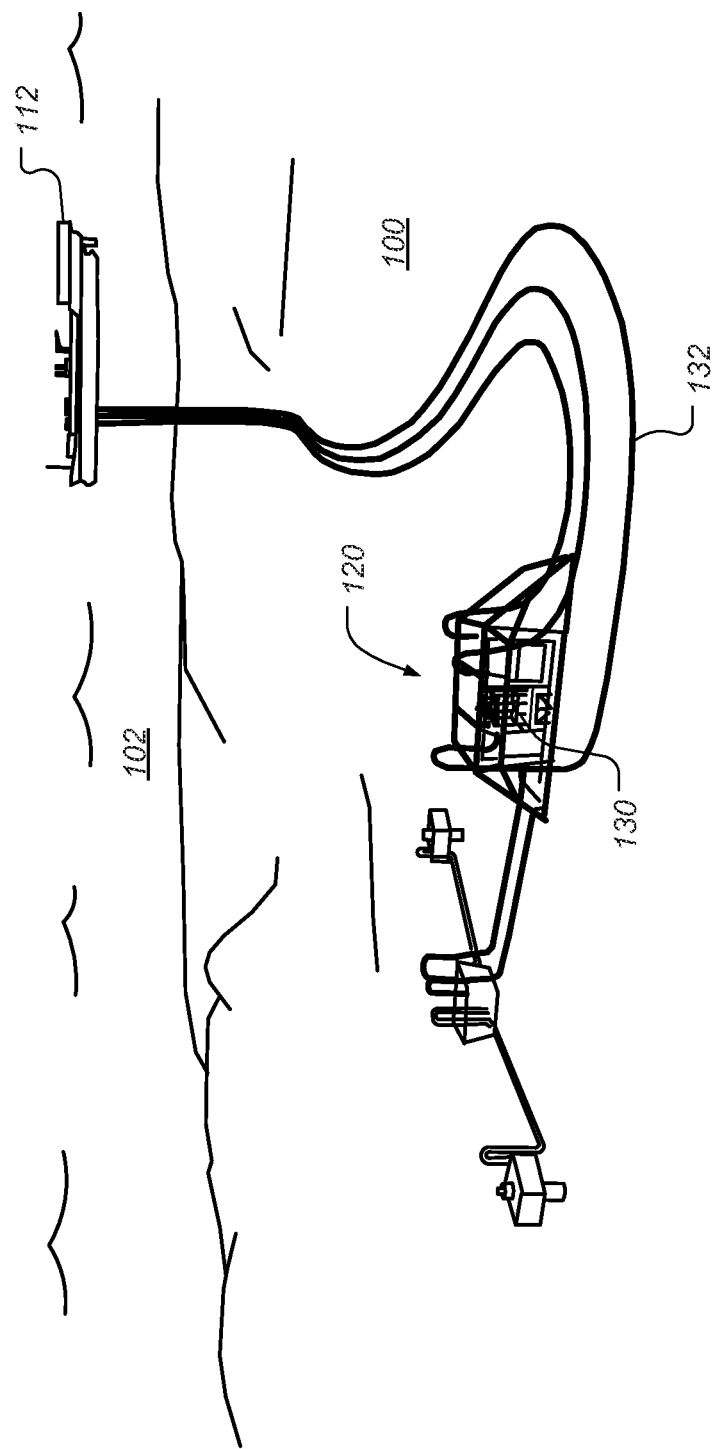
FIG. 1 is a diagram illustrating a subsea environment in which high temperature process fluid is being pumped or compressed, according to some embodiments.

FIG. 1 is a diagram illustrating a subsea environment in which high temperature process fluid is being pumped or compressed, according to some embodiments. On sea floor 100 a subsea station 120 is shown which is downstream of several wellheads being used, for example, to produce high-temperature hydrocarbon-bearing fluid from a subterranean rock formation. Subsea station 120 includes a subsea pump unit or subsea compressor unit 130. The subsea station 120 is connected to one or more umbilical cables, such as umbilical 132. The umbilicals in this case are being run from a floating production, storage and offloading unit (FPSO) 112 through seawater 102, along sea floor 100 and to station 120. In other cases, the umbilicals may be run from some other surface facility such as a platform, or a shore-based facility. In addition to pump/compressor unit 130, the station 120 can include various other types of subsea equipment. The umbilical 132 is used to supply barrier fluid for use in the subsea pump or compressor (which includes and oil-filled electric motor). Further, umbilical 132 provides electrical power to station 120. According to some embodiments, the umbilicals also provide other functionality such as: data transmission (e.g. control signals from the surface to the station, as well as data from the station to the surface); and energy to the station in other forms (e.g. hydraulic). In certain geographical regions, such as the Gulf of Mexico, the processed fluid (i.e. the produced fluid that is being compressed and/or pumped in station 120) is of relatively high temperature.

Figure 2:
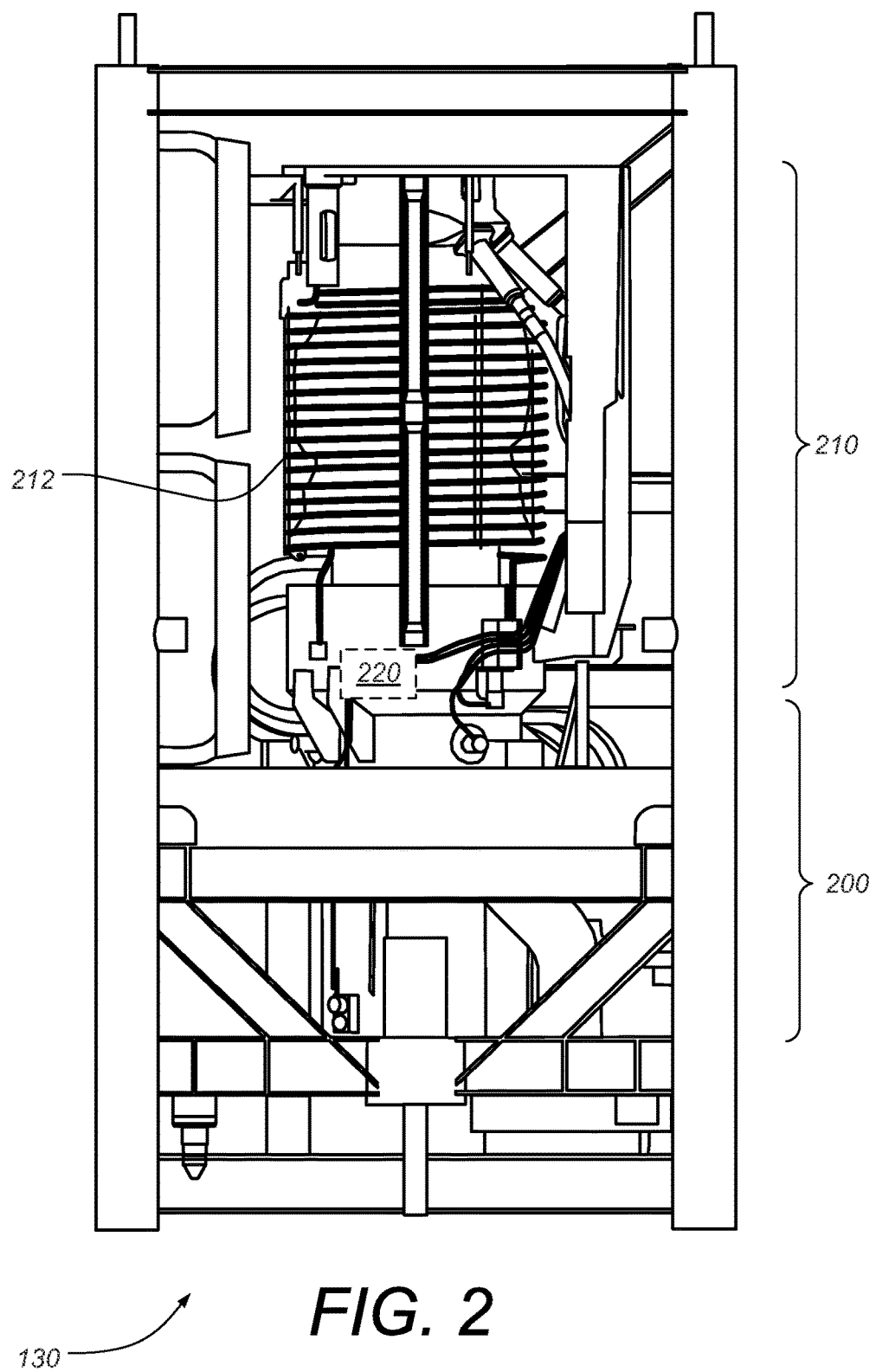
FIG. 2 is a diagram illustrating a subsea pump/compressor configured to process high temperature fluid in a subsea environment, according to some embodiments.

FIG. 2 is a diagram illustrating a subsea pump/compressor configured to process high temperature fluid in a subsea environment, according to some embodiments. Subsea pump/compressor unit 130 includes a subsea pump 200 driven by a subsea motor 210. According to some embodiments, subsea motor 210 is an oil-filled motor that is supplied with barrier fluid via an umbilical from the surface (as shown in FIG. 1). According to some embodiments, motor 210 also includes a circumferentially arranged barrier fluid cooling coil 212.

Unlike topside (i.e. surface) applications, which have far greater flexibility in terms of circulating an independent cooling fluid around the seal, the introduction of a separate cooling fluid is not often practical for subsea dynamic sealing applications. According to some embodiments, the pump/compressor unit 130 includes methods and systems that use existing fluids of pump/compressor to adequately maintain the temperature of dynamic seals within pump 200 within a suitable range despite the high temperature of the fluid being processed. Note that although pump 200 has been described as a subsea pump herein, the methods and structures are equally applicable to subsea compressors. Accordingly, as used herein, the term pump also refers to compressors. Furthermore, it will be appreciated that the techniques described herein are also applicable to other types of subsea equipment that make use of dynamic seals and which would benefit from protection from exposure to high temperature process fluids.

According to some embodiments, the barrier fluid is circulated using an impeller attached to the motor 210. In such cases, according to some embodiments, an auxiliary barrier fluid circulation pump 220 can be added to provide for circulation of the barrier fluid at times when the motor 210 is not operating. The capability for maintaining circulation of barrier fluid can be useful, for example when pumping of a hot process fluid has just ceased. By maintaining process fluid circulation after the motor 210 and pump 200 has stopped, adverse effects of temperature rising due to the presence of the hot process fluid can be alleviated. The use of auxiliary pump 220 can be used in embodiments relating to the use of process fluid cooling (FIGS. 3A, 3B and 3C) as well the use of heat shielding (FIGS. 4A, 4B, 4C, 5A and 5B), which are described in further detail, infra.

Figure 3A:
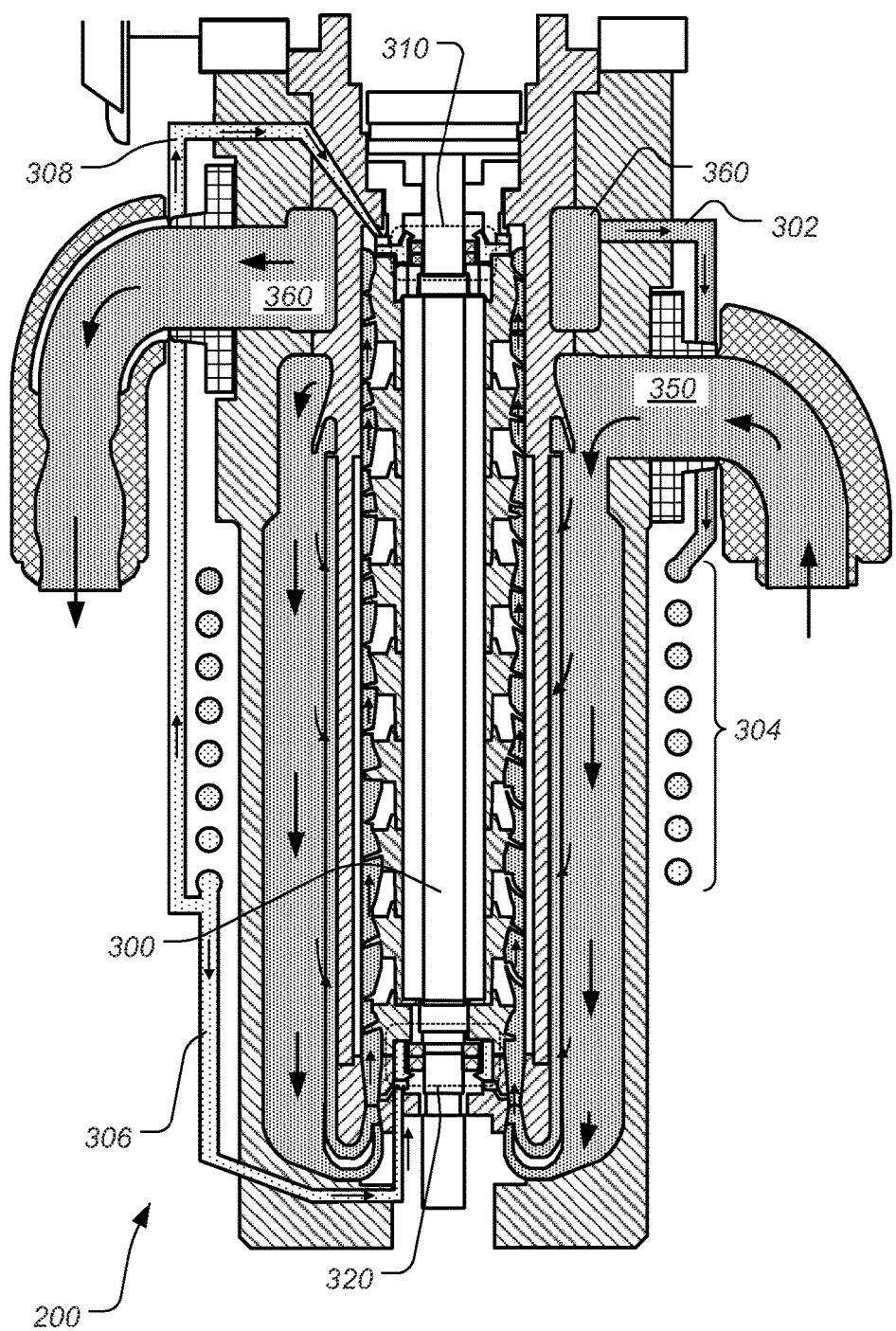
FIG. 3A is a diagram illustrating a subsea pump with integrated process fluid cooling for processing high-temperature fluid in a subsea environment, according to some embodiments.

FIG. 3A is a diagram illustrating a subsea pump with integrated process fluid cooling for processing high-temperature fluid in a subsea environment, according to some embodiments. In pump 200, hot process fluid enters pump 200 at intake 350. An inner shaft 300 is driven by subsea motor 210 (shown in FIG. 2). An upper dynamic seal 310 and a lower dynamic seal 320 act to seal-off the rotating inner shaft and rotating impeller stages from the non-rotating components of pump 200. The pressure of the process fluid increases through each impeller steps. Temperature also increases while process fluid travels through the pump 200. The magnitude of the increase depends on the pump design, gas content of the fluid, and also other characteristics of the process fluid. The process fluid exits pump 200 via outlet 360. In cases where the process fluid is of high-temperature, the dynamic seals 310 and 320 are protected from the hot process fluid by circulating a stream of cooled process fluid over the "external" faces of dynamic seals 310 and 320. The term "external" in this case means surfaces that are exposed to the process fluid; while the term "internal" refers to surfaces exposed to the internal barrier fluid. Prior to passing the hot process fluid over the external surfaces of seals 310 and 320, the fluid is cooled. In the example shown in FIG. 3A, a portion of the process fluid exits the outlet 360 via conduit 302. The process fluid then passes through a circumferential cooling coil 304 where the fluid is cooled through exposure of the coil to ambient sea water. After being cooled, conduit 306 feeds the cooled process fluid to the external surface of seal 320, and conduit 308 feeds the cooled process fluid to the external surface of seal 310. Note that additional pumps are not required in the embodiment shown FIG. 3A since the pressure at the outlet 360 is substantially higher than at the external surfaces of the seals 310 and 320. According to some alternative embodiments, however, instead of driving the circulation with the process pressure differential, a separate pump, pumping segment, impeller or screw may be used to induce the circulation through the cooling structure.

When designing the conduits 302, 306 and 308, nozzle 390 as well as the cooling coil 304 (e.g. the spacing and number of windings, etc.), the flow rates through the cooling structure should be tuned according to the expected conditions of the pump 200 and the expected properties of the process fluid being processed. For example, if the fluid velocity and/or level of cooling is not adjusted properly, hydrate formation may occur and the conduits and/or cooling coil may become blocked.

FIG. 3B is a diagram illustrating further details of cooling subsea dynamic seals using cooled process fluid, according to some embodiments. The cooled process fluid enters the vicinity of upper dynamic seal 310 of pump 200 (as shown in FIG. 3A) through conduit 308. The fluid is distributed into circumferential volume 336 via perforations in circumferential ring 330. According to some embodiments, instead of ring 330, the cooled process fluid is distributed using perforations in the pump casing itself, or by other suitable means. The dynamic seal 310 is made up of upper sealing ring 332, which is stationary, and lower sealing ring 334, which rotates with the central shaft 300. The seal 310 has external surfaces 342 and 344 that are exposed to the process fluid as shown. Seal 310 also has internal surfaces that are exposed to barrier fluid, which is located in regions 370 and 372. The barrier fluid is pressurized higher than the process fluid such that a small amount of barrier fluid naturally escapes, between the sealing rings 332 and 334 and into volume 336, thereby acting to continuously lubricate the dynamic seal 310 with a supply of clean barrier fluid. Note that in the arrangement of FIG. 3B, external surfaces 342 and 344 are exposed to the cooled process fluid, shown lighter shading, rather than to the un-cooled process fluid that is shown in darker shading. Thus the dynamic seal 310 is effectively protected from the potentially damaging temperature-related effects that could result from exposure to the un-cooled process fluid. Note that although FIG. 3B shows details for the example of the upper dynamic seal 310, an analogous arrangement exists for the lower dynamic seal 320, according to some embodiments.

According to some other embodiments, the external surfaces 342 and 344 are enclosed such that only a small volume of process fluid that is located in the proximity of the surfaces 342 and 344 needs to be cooled. According to some embodiments, a heat shield enclosure design, such as shown in greater detail in FIGS. 4A, 4B, 4C, 5A and/or 5B can be used in combination with the fluid process cooling structures shown. For example, the small volume can be enclosed with a labyrinth seal principle or by allowing a small gap between moving and static parts. This small gap can have different layouts for optimization in avoiding dirt and sand coming on the inside of the shield.

Figure 3C:
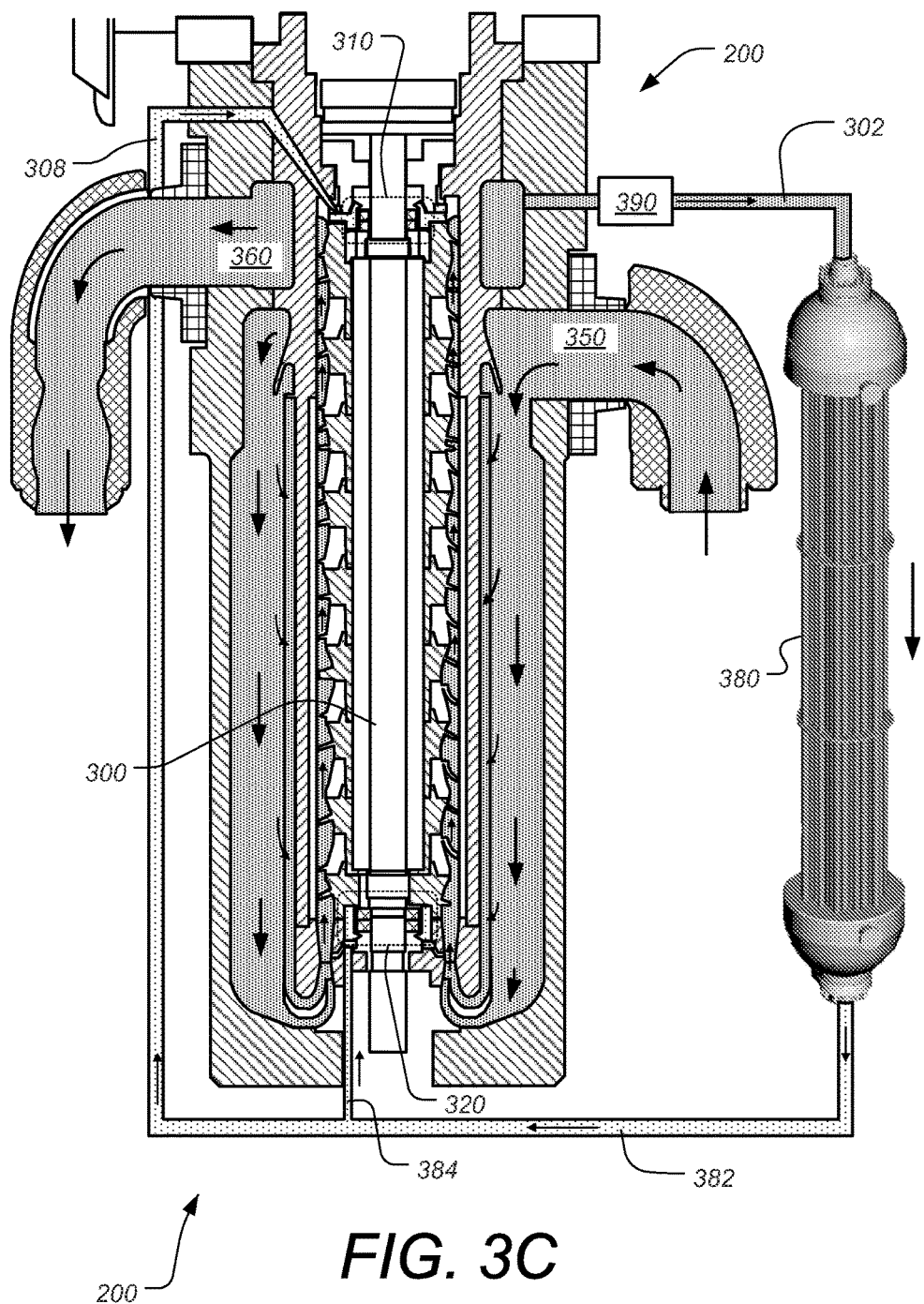
FIG. 3C is a diagram illustrating a subsea pump and a separate process fluid cooling unit for processing high-temperature fluid in a subsea environment, according to some embodiments.

FIG. 3C is a diagram illustrating a subsea pump and a separate process fluid cooling unit for processing high-temperature fluid in a subsea environment, according to some embodiments. In this case pump 200 is equipped with a process fluid cooling system that uses an external heat exchanger 380. A portion of the process fluid exits the outlet 360 via conduit 302. The process fluid then passes through heat exchanger 380 where the fluid is cooled through exposure of the coil to ambient sea water. After being cooled, the process fluid returns via conduit 382. Conduit 384 feeds the cooled process fluid to the external surface of seal 320, and conduit 308 feeds the cooled process fluid to the external surface of seal 310. According to some embodiments, restriction (such as a nozzle) 390 is included on conduit 302 so that fine tuning of the amount of flow through the heat exchanger 380 (or cooling coil 304 in the case of FIG. 3A) can be achieved. As in the case shown in FIG. 3A, the flow through the cooling structures can be accomplished via differential pressure, or by using an additional pump unit (not shown).

Figure 4A:
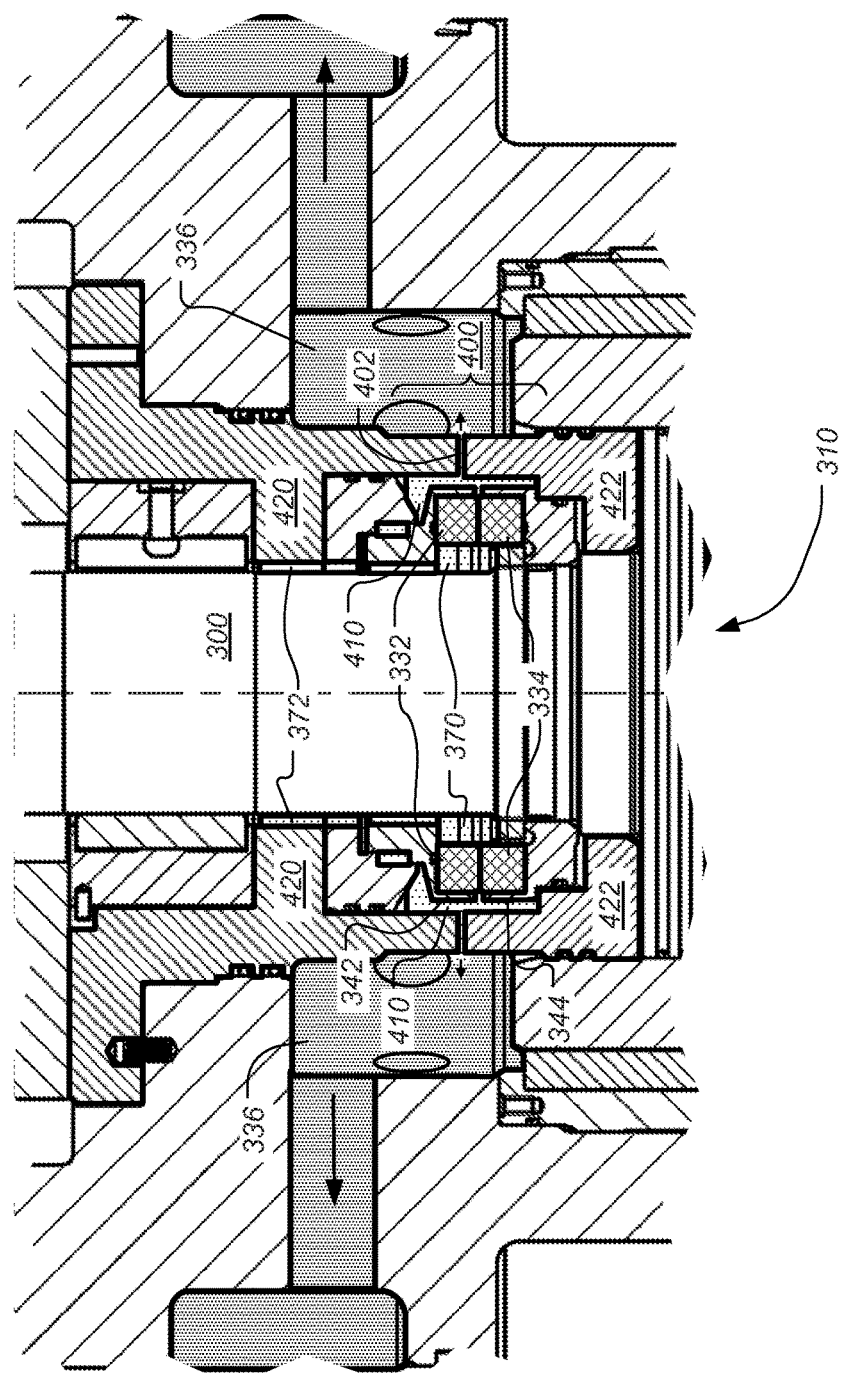
FIG. 4A is a diagram illustrating aspects of cooling dynamic seals using heat shielding and barrier fluid, according to some embodiments.

FIG. 4A is a diagram illustrating aspects of cooling dynamic seals using heat shielding and barrier fluid, according to some embodiments. According to some embodiments, the protection of the upper dynamic seal 310 from adverse effects of the hot process fluid does not rely on separate process fluid cooling structures such as cooling coil 304 in FIG. 3A and/or heat exchanger 380 in FIG. 3C. Instead, the examples shown in FIGS. 4A, 4B, 4C, 5A and 5B used a combination of heat shielding and circulation of barrier fluid in the vicinity of the dynamic seals. In the case of FIG. 4A, the upper (static) seal holding structure 420 and the lower (rotating) seal holding structure 422 are shaped such that they form a heat shield 400 between the hot process fluid in volume 336 and sealing rings 332 and 334. A small enclosed volume 410 is defined by the inner surfaces of heat shield 400 and the outer surfaces 342 and 344 of seal 310.

Seal 310 also has internal surfaces that are exposed to clean barrier fluid, which are located in regions 370 and 372. The barrier fluid is pressurized higher than the process fluid such that a small amount of barrier fluid escapes, for example, between the sealing rings 332 and 334 and into enclosed volume 410, thereby acting to continuously lubricate the dynamic seal 310 with a supply of clean barrier fluid. Thus the enclosed volume 410 is largely filled with clean barrier fluid that is cooler than the hot process fluid in volume 336. The heat shield 400 has a small gap 402 between the structures 420 and 422 through which barrier fluid flows into volume 336. Thus the arrangement shown acts to protect the barrier fluid acts to protect seal 310 from adverse temperature effects of hot process fluid by both shielding heat from the process fluid as well as providing circulation of cool barrier fluid around the seal. Furthermore, by enclosing the volume 410 which is mostly or fully filled with clean barrier fluid rather than process fluid, the sealing rings 332 and 334 are surrounded by a high fraction of clean barrier fluid, which helps to maintain the integrity of the sealing rings.

Note that in many cases, some portions of enclosed volume 410, for example the regions of enclosed volume 410 above the level of the gap 402 will contain a mixture of process fluid and barrier fluid. However, since there is little or no flow of hot process fluid into enclosed volume 410 the mixture will have cooled sufficiently so as not to negatively affect the sealing rings 332 and 334.

FIGS. 4B and 4C are diagrams illustrating further aspects of cooling dynamic seals using heat shielding and barrier fluid, according to some embodiments. In FIG. 4B, the gap 404 between the upper (static) seal holding structure 420 and the lower (rotating) seal holding structure 422 is in a step-wise shape. The step-wise shape of gap 404 has been found to aid in protecting volume 410 from process fluid and potential sand particles. Note that any gap shape (straight or step-wise) will provide a pumping action to move fluid through the gap from enclosed volume 410 to volume 336. The effective length of the step-wise gap 404 is also longer than a straight gap such as gap 402 in FIG. 4A. Also, due to elongation and contraction of the components in the longitudinal direction (parallel to the primary axis of the pump) the step-wise gap can be made with tighter tolerances at least in the vertical portion of the gap. Thus a step-wise gap can provide greater protection to the seal rings 332 and 334 from contaminants from the process fluid. For example, problems such as scale build up, hydrate formation, and sand and other particulate contamination, can be alleviated by providing a high degree of protection. FIG. 4C similarly has a step-wise shaped gap 406. According to some embodiments, the gap design may consist of several steps, such as shown in FIG. 5B, infra.

According to some embodiments, a relatively good heat conductive material is used, either entirely or partially, for the static seal holder 420 and/or in the dynamic seal holder 422. In such embodiments, the cooler barrier fluid is used to cool the process fluid in the proximity to the seal indirectly through the conductive material.

According to some embodiments, the structure of the seal holders 420 and/or 422 can be configured to increase cooling from the barrier fluid. For example, the static seal holder 420 can have fins and/or labyrinth channels therein. According to some embodiments, the barrier fluid circulates internally in the static seal holder using internal pressure differences in the barrier fluid system. In some cases a separate impeller or pump can be used to circulate the barrier fluid around the pump 200 (shown in FIG. 2) to cool and lubricate. Such a pump may be driven by the pump itself or by an auxiliary pump having its own electric power supply, such as auxiliary pump 220 (shown in FIG. 2). In addition to an impeller pump, there may be one or several internal screws/discs for barrier fluid circulation throughout the barrier fluid system to cater for viscous losses. In the case of the rotating seal holder 422, flow of the barrier fluid through internal channels can be enhanced through the geometry of channels/volumes, and using restrictions to balance fluid flow in multiple channels. An example of such balancing of flows is described infra with respect to flow paths 585 and 587 shown in FIG. 5A.

Figure 5B:
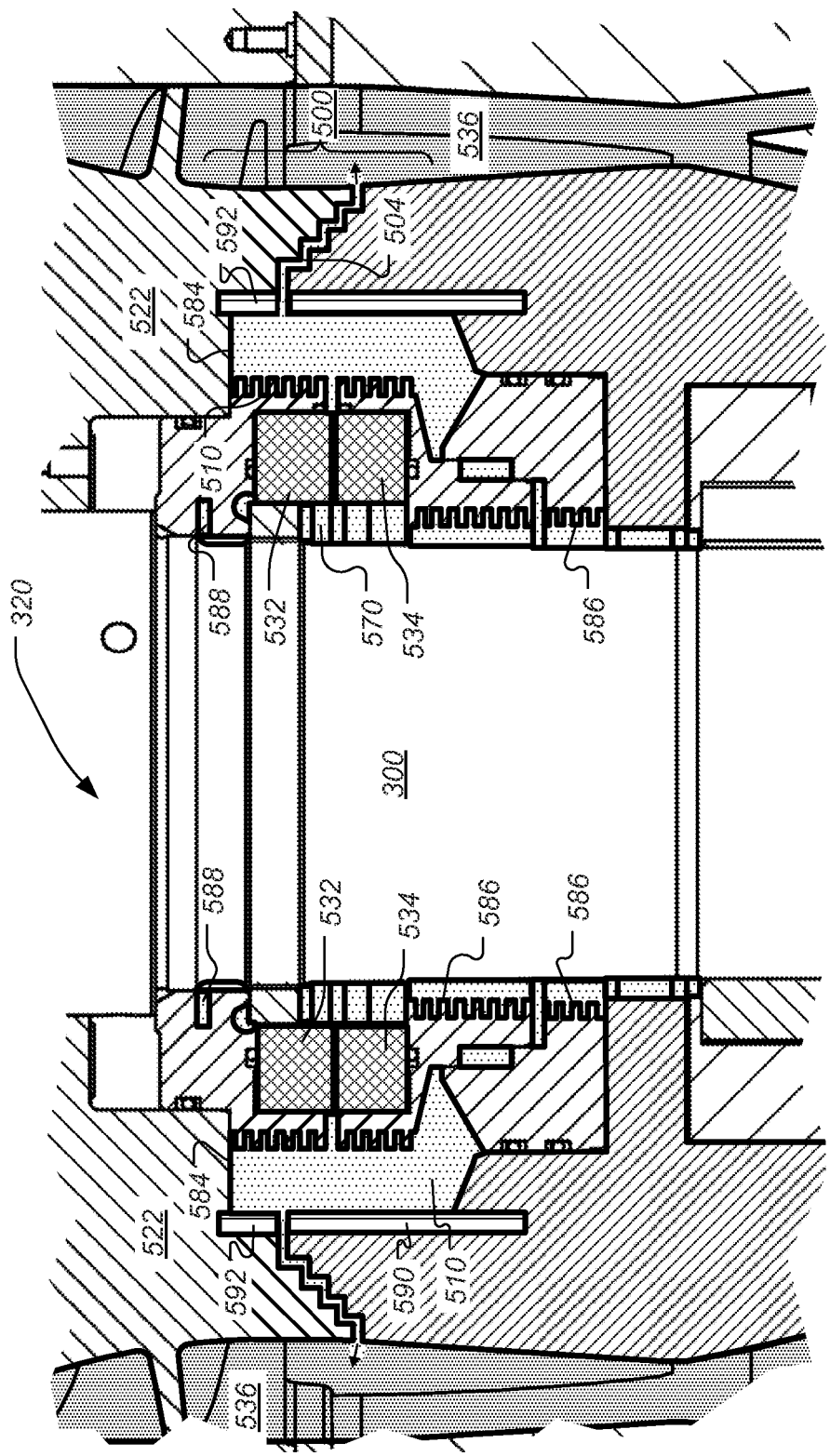

FIGS. 5A and 5B are diagrams illustrating aspects of cooling dynamic seals using heat shielding and barrier fluid, according to some embodiments. Further details of the protection of the lower dynamic seal 320 from adverse effects of the hot process fluid will now be provided. In FIG. 5A, the lower (static) seal holding structure 520 and the upper (rotating) seal holding structure 522 are shaped such they form a heat shield 500 between the hot process fluid in volume 536 and sealing rings 532 and 534. A small enclosed volume 510 is defined by the inner surfaces of heat shield 500 and the outer surfaces of seal 320 which are shown in these examples with fins 584 and 585.

Seal 320 also has internal surfaces that are exposed to clean barrier fluid, which are located in region 570. The barrier fluid is pressurized higher than the process fluid such that a small amount of barrier fluid escapes, for example, between the sealing rings 532 and 534 and into enclosed volume 510, thereby acting to continuously lubricate the dynamic seal 320 with a supply of clean barrier fluid. Thus the enclosed volume 510 is largely filled with clean barrier fluid that is cooler than the hot process fluid in volume 536. The heat shield 500 has a small gap 502 between the structures 520 and 522 through which barrier fluid flows into volume 536. Thus the arrangement shown acts to protect seal 320 from adverse temperature effects of hot process fluid by both shielding heat from the process fluid as well as providing circulation of cool barrier fluid around the seal. Furthermore, by enclosing the volume 510 which is mostly or fully filled with clean barrier fluid rather than process fluid, the sealing rings 532 and 534 are surrounded by clean barrier fluid, which helps to maintain the integrity of the sealing rings.

According to some embodiments, to further enhance the cooling effect of the barrier fluid on the sealing rings 532 and 543, structural elements such as fins 584, 585 and 586 can be added to increase the heat transferring ability to the circulating barrier fluid. Other structures can also be added, to enhance heat transfer, such as groove 588.

According to some embodiments, the shielding effect of shield 500 can be enhance by using alternative materials such as insulators 590 and 592, which are positioned on the inner (and therefore cleaner side) of shield 500. In some examples, the insulators 590 and 592 can be made of bands of thermoplastic material such as PTFE or PEEK, which have both good insulation and chemical corrosion resistance properties.

According to some embodiments, temperature protection of seal 320 by the barrier fluid is enhanced by a cut-out area 580. Fluid may return through channel 582 by using necessary restriction to tune pressures to get the flow in the desired path. In this example shown in FIG. 5A, the barrier fluid enters along path 581. The barrier fluid then flows along both paths 585 and 587 (which leads to area 580). Due to a designed restriction 583 in the flow path 585, the desired flow can be directed along path 587. Note that channel 582 can be an open circumferential volume section or it can be a drilling, or a combination of both. According to some other embodiments, such as described with respect to FIGS. 4A, 4B and 4C, labyrinth paths can be formed in the rotating seal holder 522 and/or static seal holder 520.

FIG. 5B shows an example of a multi-step shaped gap 504. In the case of FIG. 5B, the gap 504 has a descending stair-shape (in the direction from internal towards external), which has a benefit of increasing the protection of the seals from particulate matter. Note that other types of shapes of gaps can be used, including but not limited to ascending stair, notched, labyrinth, and combinations thereof, according to some embodiments.

According to some embodiments, a combination of techniques shown in FIGS. 4A, 4B, 4C, 5A and 5B may be used for the enhanced protection of either the upper seal 310 or lower seal 320. For example, a combination of cooling fins, a step-wise gap, insulators, and/or other structures (such as cut-out area 580 and its associated flow channels) can be used with the lower seal 320 and/or the upper seal 310.

According to some embodiments, a combination of techniques described herein in any of the figures can be used. For example, in some embodiments, process fluid cooling, such as shown in FIGS. 3A, 3B and/or 3C can be combined with heat-shielding/barrier fluid protection techniques, such as shown in FIGS. 4A, 4B, 4C, 5A and/or 5B.

Although FIGS. 4A, 4B, 4C, 5A and 5B are shown for a pump/compressor 200 which has a rotating shaft within a stationary body, according to some embodiments, pump/compressor 200 is of a contra-rotating design. In such contra-rotating designs some or all of the dynamic seals (e.g. 310 and 320) and heat shielding members (e.g. 400 and 500) will be contra-rotating such that one portion of the seal or shield rotates in one direction about the central axis and the other portion rotates in the opposite direction about the central axis.

While the subject disclosure is described through the above embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. A subsea fluid processing machine adapted to process a high-temperature subsea process fluid, the machine comprising:
   a stationary machine body configured for deployment in a subsea location;
   at least one rotating member configured to rotate about a central axis thereby mechanically processing said high temperature process fluid at the subsea location;
   a dynamic seal configured to form a mechanical seal between said rotating member and second member of the machine, the dynamic seal including a first and second seal portions that are configured to rotate with respect to each other;
   a shielding portion positioned and configured to shield said dynamic seal from said high temperature process fluid; and
   an enclosed volume defined by said shielding portion and one or more surfaces of said dynamic seal, the volume configured to contain a lubricating fluid that is cooler than said high temperature process fluid;
   wherein said shielding portion comprises a stationary portion configured to remain stationary with the machine body and a rotating portion configured to rotate with the rotating member.

2. A machine according to claim 1 wherein said second member is said stationary body.

3. A machine according to claim 1 wherein said rotating member includes a rotating central shaft and at least one impeller fixed thereto configured to increase the pressure of the process fluid as the impeller is rotated.

4. A machine according to claim 1 wherein the machine is of type selected from a group consisting of: subsea pump and subsea compressor.

5. A machine according to claim 1 wherein the lubricating fluid is a machine barrier fluid.

6. A machine according to claim 1 wherein said first seal portion is configured to rotate about the central axis and said second seal portion is configured to remain stationary, and seal portions each have a primary sealing surface that intimately contact one another to form the mechanical seal.

7. A machine according to claim 1 wherein said first seal portion is configured to rotate a first direction about the central axis and said second seal portion is configured to rotate in a second direction opposite to the first direction about the central axis, and said first and second seal portions each have a primary sealing surface that intimately contact one another to form the mechanical seal.

8. A machine according to claim 1 wherein the stationary and rotating portions of the shielding portion define a gap there between which said lubricating fluid is configured to pass through.

9. A machine according to claim 8 wherein said gap includes a portion parallel to the central axis of the machine.

10. A machine according to claim 9 wherein said gap is step-wise shaped.

11. A machine according to claim 1 further comprising one or more seal holding structures configured to enhance heat exchange between the lubricating fluid and the dynamic seal.

12. A machine according to claim 11 wherein said one or more seal holding structures comprises a plurality of fins formed on a surface defining said enclosed volume.

13. A machine according to claim 11 wherein said one or more seal holding structures include one or more channels through which the lubricating fluid is configured to circulate for cooling purposes.

14. A machine according to claim 1 further comprising one or more seal holding structures configured to insulate said dynamic seal from said high temperature process fluid.

15. A machine according to claim 14 wherein said one or more seal holding structures includes an insulating material disposed on an inner surface of said shielding portion.

16. A machine according to claim 1 wherein said shielding portion and said enclosed volume are configured to isolate the dynamic seal from contamination from said process fluid thereby reducing adverse effects to the dynamic seal due to exposure to said process fluid.

17. A machine according to claim 1 further comprising:
a second dynamic seal configured to form a second mechanical seal between said stationary body and said rotating member;
a second shielding portion positioned and configured to shield said second dynamic seal from said high temperature process fluid; and
a second enclosed volume defined by said second shielding portion and one or more surfaces of said second dynamic seal, the volume configured to contain the circulating lubricating fluid.

18. A machine according to claim 1 further comprising a process fluid cooling system configured to cool a portion of the high temperature process fluid thereby further reducing adverse effects to the dynamic seal due to exposure to said high-temperature process fluid.

19. A machine according to claim 1 further comprising an auxiliary barrier fluid circulation pump configured to circulate the barrier fluid when a motor used to drive the rotating member is not running.

20. A subsea fluid processing machine adapted to process a high-temperature subsea process fluid, the machine comprising:
a stationary machine body configured for deployment in a subsea location;
at least one rotating member configured to rotate about a central axis thereby mechanically processing said high temperature process fluid at the subsea location;
a dynamic seal configured to form a mechanical seal between said rotating member and a second member of the machine, the dynamic seal including a first and second seal portions that rotate with respect to each other; and
a process fluid cooling system configured to cool a portion of the process fluid and direct said cooled process fluid towards said dynamic seal thereby reducing adverse effects to the dynamic seal due to exposure to un-cooled high-temperature process fluid;
wherein the process fluid cooling system comprises a plurality of circumferential coils surrounding the machine body, the plurality of circumferential coils coupled between an outlet conduit in fluid communication with a fluid outlet of the stationary machine body and an inlet fluid conduit configured to direct the cooled process fluid towards the dynamic seal.

21. A machine according to claim 20 wherein said second member is said stationary body.

22. A machine according to claim 20 wherein said process fluid cooling system is configured to cool the process fluid by transferring heat from the process fluid to ambient seawater.

23. A machine according to claim 22 wherein said process fluid cooling system is integrated into said machine.

24. A machine according to claim 22 wherein said process fluid cooling system includes a separate heat exchanger unit.

25. A machine according to claim 20 wherein said rotating member includes a rotating central shaft and at least one impeller fixed thereto, the impeller configured to increase the pressure of the process fluid as the impeller is rotated, and wherein the machine is a subsea pump or a subsea compressor.

* * * * *